UNITED STATES PATENT OFFICE.

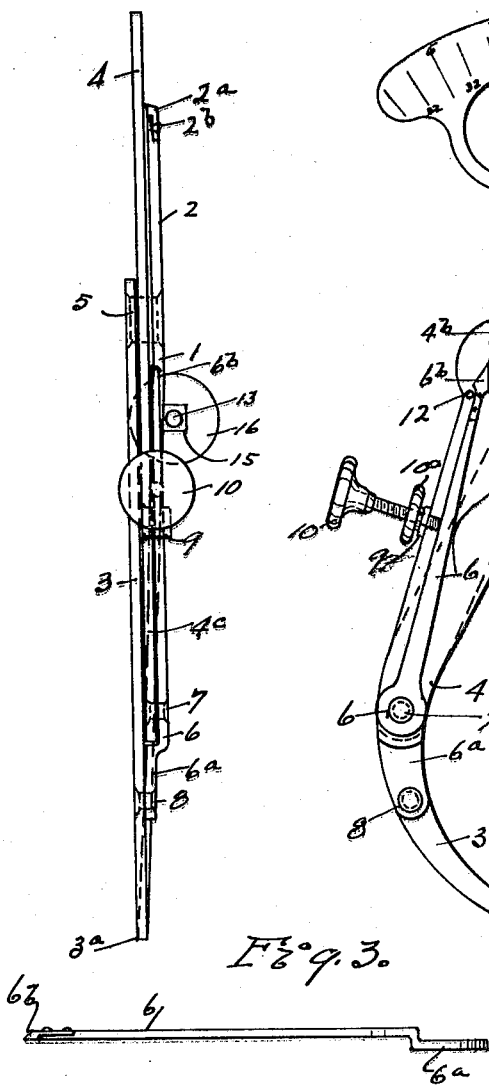

GUSTAV H. NASSTROM, OF SEATTLE, WASHINGTON.

CALIPERS.

1,146,439.

Specification of Letters Patent.  Patented July 13, 1915.

Application filed August 19, 1914. Serial No. 857,460.

*To all whom it may concern:*

Be it known that I, GUSTAV H. NASSTROM, a citizen of the United States, and a resident of Seattle, in the county of King and State of Washington, have invented certain new and useful Improvements in Calipers, of which the following is a specification.

My invention relates to calipers, and has for its principal object to provide a device of this character having a maximum limit scale, and an amplifying differential scale which automatically shows the exact amount of over-size above the setting of the calipers; that is to say which positively shows the exact distance which the measuring points of the device have to be extended in order to just pass over the object to be measured.

A further object is to provide means for compensating the reading of the calipers for any wear which may occur upon the points thereof.

Other objects will appear as the invention is more fully hereinafter described, and explained, illustrated in the accompanying drawings and pointed out in the appended claim.

In the drawings, Figure 1 is a front elevation of my device. Fig. 2 is a side elevation thereof. Fig. 3 is a detail view of the amplifying indicator.

Referring now more particularly to the drawings, reference numeral 1 designates one leg of a caliper of the form as plainly shown, which terminates at its lower end in a contact point 1$^a$. The leg 1 terminates at its upper end in an indicating hand 2, which is provided with a tip 2$^a$, which has enlarged holes through it adapted to receive the screws 2$^b$ which adjustably secure the said tip to the said indicating hand. The said holes allow the said tip to be moved slightly to either side or outwardly and inwardly, thereby adjusting the length of the hand to compensate for wear upon the contact point 1$^a$. The tips may be adjusted by loosening their holding screws, setting the tips to the proper point on the scale and again setting up the screws. The leg 1 is movably secured to another leg 3 and a quadrant 4, by a rivet 5, and the said leg 3 terminates in a contact point 3$^a$ which coincides with the contact point 1$^a$. The quadrant 4 is provided with a scale 4$^a$ upon its upper end, which I will designate as a maximum limit scale, and it is also provided with another scale 4$^b$ located below the rivet 5, and which I will call the differential amplifying scale. The lower end of the quadrant 4 terminates in an extension 4$^c$ which closely coincides with the leg 3. The leg 3 and quadrant 4 are connected by a moving hand 6, which is of the shape as shown in Fig. 3, and has an off-set portion 6$^a$. A rivet 7 connects the hand 6 and quadrant 4, while a similar rivet 8 connects the end 6$^a$ to the leg 3. The moving hand 6 is equipped with a point 6$^b$, which is similar to, and performs the same function as, the point 2$^a$. An upstanding lug 9 from the quadrant 4 has a threaded hole through which a limit screw 10 passes, being held by a jam nut 10$^a$. The end of the limit screw bears against the side of the hand 6, thereby providing means for a very accurate adjustment of the position of the hand 6 relative to the scale 6$^b$. The hand 6 is yieldingly held in the position shown in Fig. 1 by means of a spring 11, which is secured to the quadrant 4 by a pin 11$^a$. A limit stop 12 prevents the hand 6 from leaving the scale 4$^b$. The scales 4$^a$ and 4$^b$ in this instance are divided to read in sixty-fourths of an inch. The leg 1 and quadrant 4 are adjustably secured together by a screw 13 which passes through lugs 14 and 15 which are secured to the said leg 1 and quadrant 4 respectively, the screw 13 being secured to the latter and passing loosely through the former, and being held by an adjusting nut 16 and a jam nut 17. The lugs 14 and 15 are held apart by a spring 18.

It is believed that the operation of my device can be best described by example, as follows:—If it be desired to calibrate a shaft which is being turned down in a lathe, the diameter of which when finished is to be exactly two inches, the hand 2 is moved along the scale 4$^a$ to the 2-inch mark and there firmly set by means of the nut 16 and its jam nut 17, as will be understood. The shaft may now be calibrated from time to time as the turning progresses by separating the legs 1 and 3 beyond the size of the shaft (whatever it happens to be at the time of such calibrating) by either operating the thumb-screw 10 or simply moving the leg 3 away from the leg 1 about their common pivot 5, which throws the indicating hand 6 to the right about the rivet 7, the off-set portion 6$^a$ of the hand 6 moving to the left, carrying the leg 3 with it by means of the connecting rivet 8. The contact points 1ᵃ and 3ᵃ may now be passed over the shaft and the hand 6 adjusted by means of the thumb-screw 10 until the size of the shaft at that time be ascertained. The oversize, or the amount yet to be turned off of the shaft is now read directly upon the differential amplifying scale 4ᵇ.

It will be understood that the above result has been accomplished without changing the setting of the maximum limit scale 4ᵃ, and without the necessity of using a rule or other such measuring instrument to measure the distance between the points 1ᵃ and 3ᵃ, and that the exact amount yet to be turned off of the shaft to make it the pre-determined size, as shown by the maximum limit scale, is accurately shown by the differential amplifying scale 4ᵇ.

In the drawings I have shown the principal divisions of the maximum scale 4ᵃ one (1) inch apart, and the smallest division of that scale as sixty-fourths of an inch, and in the differential amplifying scale the divisions are sixty-fourths, but any other suitable division for both of the scales would answer so long as the two scales mentioned have a fixed and positive relation with respect to each other. It will be understood, of course, that the longer the indicator 6 on the differential scale is, the greater will be the amplification of that scale; that is to say, the longer that indicator is the farther apart will be the graduations on the differential scale 4ᵇ, the marks, however, on that scale having the same value as if they were nearer together and the indicator shorter.

I have shown and described a particular form of embodiment of my invention, but am aware that many structural changes therein will readily suggest themselves to others skilled in the art without departing from the spirit and scope of the invention and I therefore desire to avoid being limited to the exact form shown and described, except as defined by the appended claim.

Having described my invention, what I claim as new and desire to protect by Letters Patent is—

In a caliper having single piece legs, the combination of a quadrant, upon which the legs of the caliper are pivoted about a common center and upon which are a maximum limit scale and a differential amplifying scale, an indicator integral with one of the legs of the caliper and which coöperates with the said maximum scale, an indicator which coöperates with the said differential amplifying scale, pivoted to the other leg of the caliper and to an extension of the quadrant proper, a limit stop for the last mentioned indicator and yielding means for normally holding the said indicator against the said limit stop, and adjustable compensating tips upon both of said indicators.

GUST. H. NASSTROM.

Witnesses:
FRED P. GORIN,
EMMA KROGER.